United States Patent
Weems

[11] Patent Number: 6,129,181
[45] Date of Patent: Oct. 10, 2000

[54] CONSTANT FORCE SPRING ACTUATOR

[76] Inventor: Weyman Weems, 4900 S. Pennsylvania St., Englewood, Colo. 80110

[21] Appl. No.: 09/084,529

[22] Filed: May 26, 1998

[51] Int. Cl.[7] ........................................................ F03G 1/00
[52] U.S. Cl. .................................. 185/37; 185/45; 60/529
[58] Field of Search ........................ 185/37, 45, DIG. 1; 60/528, 529

[56] References Cited

U.S. PATENT DOCUMENTS

| | | | |
|---|---|---|---|
| 2,954,845 | 10/1960 | Minera | 184/37 |
| 3,291,474 | 12/1966 | Clarke | 267/1 |
| 3,316,415 | 4/1967 | Taylor | 290/1 |
| 3,450,372 | 6/1969 | Gerardus de Lange et al. | 244/1 |
| 3,684,994 | 8/1972 | Tyler | 337/140 |
| 3,720,107 | 3/1973 | Shepard | 73/363.7 |
| 3,978,835 | 9/1976 | Fenton | 123/119 F |
| 4,010,455 | 3/1977 | Stange | 340/224 |
| 4,055,955 | 11/1977 | Johnson | 60/527 |
| 4,086,769 | 5/1978 | Smith | 60/527 |
| 4,761,955 | 8/1988 | Bloch | 60/528 |
| 4,772,807 | 9/1988 | Bouvot | 307/119 |
| 4,887,430 | 12/1989 | Kroll et al. | 60/527 |
| 5,086,618 | 2/1992 | Tanaka | 60/527 |
| 5,127,228 | 7/1992 | Swenson | 60/527 |
| 5,396,769 | 3/1995 | Brudnicki | 60/528 |
| 5,447,125 | 9/1995 | McNally et al. | 122/17 |

*Primary Examiner*—David M. Fenstermacher
*Attorney, Agent, or Firm*—Marsh Fischmann & Breyfogle LLP

[57] ABSTRACT

A constant force actuator transforms applied heat to an applied force on an output device. Strips of shape memory alloy are coiled into spirals and trained to have this configuration as a static state. The shape memory alloy springs are attached to the output device to apply a directional force. When one of the springs is heated, the modulus of elasticity within the spring material changes. This change in modulus increases the force which the spring exerts in returning to its static state, which in turn increases the force applied to the output device, upsetting the balance of forces and resulting in a rotation.

15 Claims, 5 Drawing Sheets

CONSTANT FORCE SPRING ACTUATOR

FIELD OF THE INVENTION

The present invention relates to a force actuator device, and more particularly to shape memory alloy spring actuator.

BACKGROUND OF THE INVENTION

In order to develop a force actuator which is simple in design and easy to operate, designers have taken advantage of the physical properties of some metals. It is well known that when heat is applied to certain metals their shape and length will change significantly. One type of actuator which incorporates this type of metal is the bimetallic strip. These strips are constructed by laminating two pieces of metal together which have very different shape changing properties relative to temperature. Changes in temperature will cause one part of the strip to expand or contract at a different rate than the other which causes a deflection in the strip. A drawback of this type of actuator is that the total amount the strip will deflect is a small percentage of its overall length.

Figure 1:
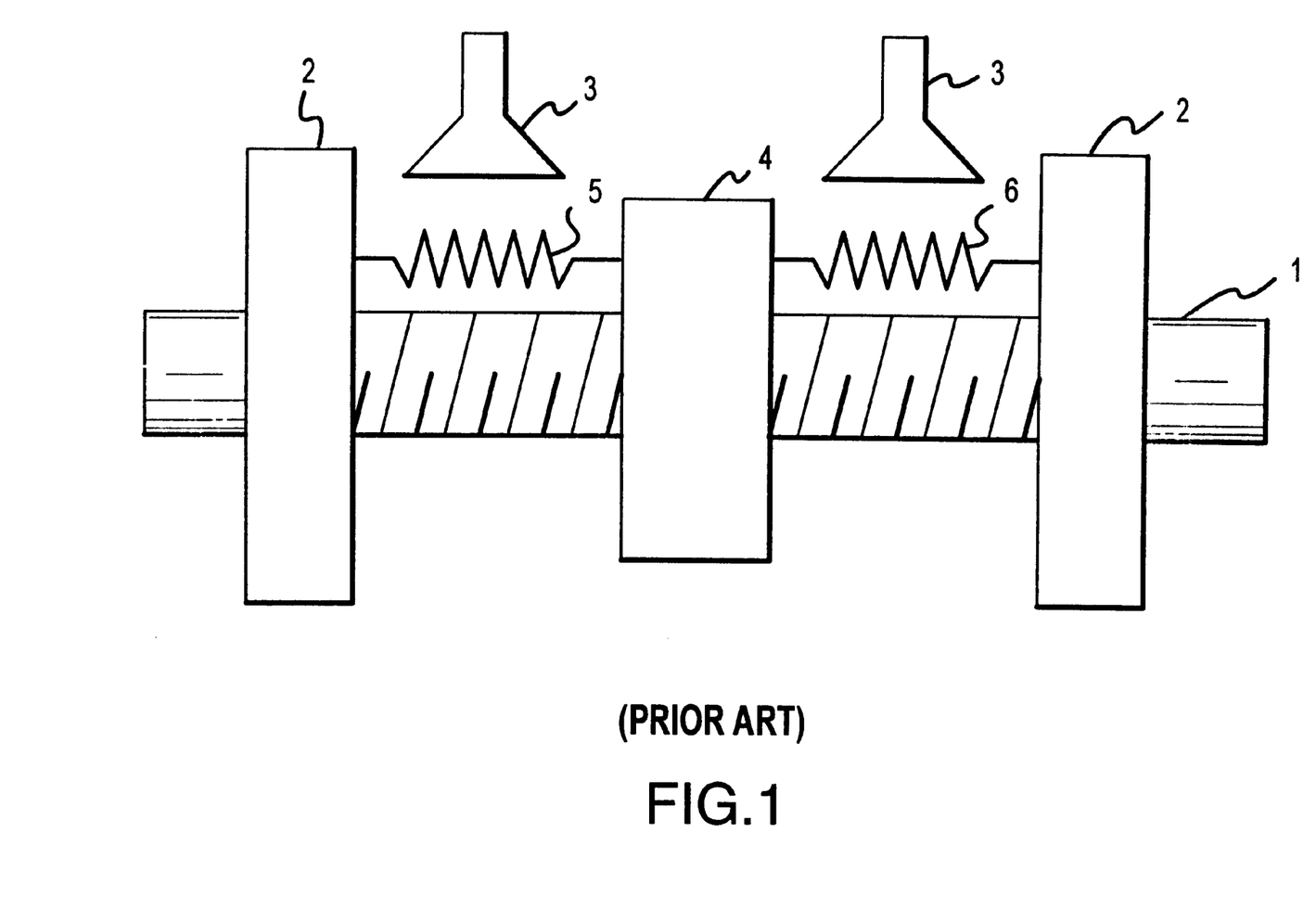
FIG. 1 is a prior art rotational actuator.

A class of metals that have particular properties relative to changes in temperature are shape memory alloys. When shape memory alloys are stretched or compressed at temperatures below their martensite temperature, they resume the size they had prior to the deformation if they are heated to above their austenite temperatures. One example of a prior art actuator which uses shape memory alloy is shown in FIG. 1. In this device, threaded cylinder 1 provides the output rotation for the actuator. Threaded onto the cylinder is translational nut 4. On either end of cylinder number 1 are stationary bearings 2. These bearings allow the output cylinder to rotate, but impede any translational movements. Connected between the stationary bearing 2 and the translational nut 4 are shape memory alloy springs 5 and 6. These springs have been trained such that they expand during the application of heat and contract when cooled. In operation, shape memory alloy spring 5 is heated by heat source 3. This spring expands and exerts a directional force on translational nut 4. The threads on this nut are designed such that when any translational force is applied, this force is transferred to the output cylinder 1 as rotation. Because the translational nut is not allowed to rotate, it moves in a rightward direction compressing the shape memory alloy spring 6. The number of rotations of cylinder 1 is limited by the thread spacing on the translational nut and body of the cylinder, the amount the shape memory alloy spring 5 will expand, as well as the original distance between the translational nut 4 and the stationary bearing 2.

The disadvantage of the rotational actuator shown in FIG. 1 is that if one desires to increase the number of rotations that the output cylinder may have in a particular direction, the size of the components must increase. For example, to increase the total number of rotations, the thread length on the output cylinder would have to increase. With a longer output cylinder, the size of the springs would also have to increase. Increases in the desired performance of the actuator significantly increase its overall size.

Therefore, it is desirable to have a constant force actuator which is simple in design and has the flexibility to change the amount of work the actuator performs without significantly changing the size of the actuator.

SUMMARY OF THE INVENTION

Described herein is a constant force actuator which imparts a force on an output device. This particular apparatus includes a first shape memory alloy spring which is connectable to a rotatable connection device as well as the output device. When the first spring is connected to an output device the shape memory alloy force has a first modulus of elasticity. Upon the application of heat to a selected area of the spring, a austenite change is effected in the selected area which creates a second modulus of elasticity. This change in modulus increases the force in which the spring is applying to the output device.

In one aspect of the invention, the spring is a strip of shape memory alloy. This spring initially has an untrained shape of a tightly coiled spiral. The spring is trained to have a static position which is this same shape. One end of the trained spring is attachable to a rotatable connection device, and the other end to the output device. In order to apply a force to the output device a selected area of the spring is heated. The selected area of the spring is that portion of the spring which extends between the rotatable connection device and the output device. The added heat increases the modulus of elasticity in the selected area which increases the forces in which the spring is exerting to return to its trained state. If the spring is able to overcome opposing forces, it will wind itself around the rotatable connection device.

In another aspect of the invention, the output device is rotatable, and the first spring applies a rotational force in one direction. The application of heat to the selected area of the first spring will increase the rotational force applied to the output cylinder, and if this force is great enough it will induce a rotation on the output device in one direction.

This apparatus may also include two equivalent shape memory alloy springs, each connected to a rotatable device, such as an output cylinder, such that they apply opposite rotational forces. In order to rotate the output cylinder, one of the two springs is heated in a selected area. The selected area is preferably the portion of the spring which extends between the output cylinder and the coiled spring on the take-up spool. As heat is applied, the modulus of elasticity changes within the spring which in turn increases the force which the spring exerts in order to return to its static state. This increase in force overcomes the opposing rotational forces of the spring not being heated, which causes the output cylinder to rotate. Heat is continually applied to the selected area until the desired number of rotations of the output cylinder has been achieved.

Heat can be applied to the selected areas of the springs in a number of ways. First, an electric potential may be created between the output cylinder and the take-up spool. With this type of heating, a electrical current passes from the take-up spool, through the spring to the output cylinder. Because of the internal resistance of the alloy, the current increases the temperature of the shape memory alloy in the areas which it passes through.

Heat can also be applied to the springs by mounting heating elements between the output cylinder and the take-up spools. The heating elements are mounted next to or touching the selected areas of the spring. Based on the desired direction of rotation, one of the heating elements is turned on and the heated spring increases the rotational force it is applying to the output cylinder.

Further, a rotational output can also be induced on the output cylinder using a passive heat source. When using a passive heat source, some sort of heat directing device is positioned between the heat source and selected areas of the shape memory alloy spring. This directing device can be either active or passive itself In the example where the sun is used as a passive light source, a set of louvers is positioned such that light only shines on selected portions of the springs at particular times during the day.

Finally, in order to apply heat to the springs, heating tape may be applied to the length of the first and second springs. Heating coils run the length of tape. When a desired rotational direction is chosen, the heating coils taped to a particular spring are activated, and the entire length of the spring is heated. This increases the rotational force applied by the heated spring on the output cylinder.

DETAILED DESCRIPTION

Figure 2:
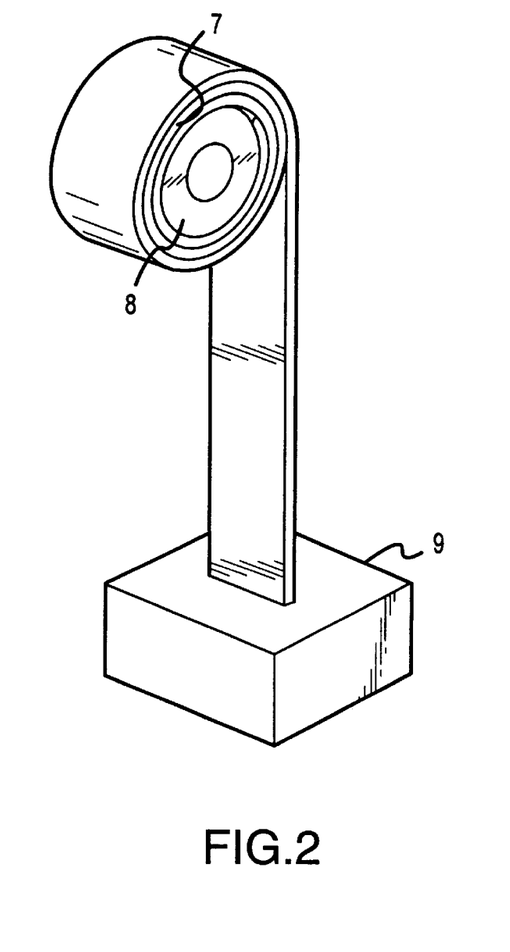
FIG. 2 is a perspective view of a constant force spring actuator.

Disclosed in FIG. 2 are the basic elements for the constant force spring actuator. Included in this actuator are shape memory alloy spring 7 and take up spool 9. The shape memory alloy spring is connected to output device 9 which can be any sort of device upon which an external force can be exerted. The coiled shape of the spring 7 in FIG. I is its static state. In order to attach the spring to the output device, it must first be elastically displaced in a direction which is opposite to its static state. This displacement induces a preload on the output device because the spring is trying to return to its static state. In the configuration shown in FIG. 2, the spring 2 is exerting an upwards force on output device 9.

Figure 5:
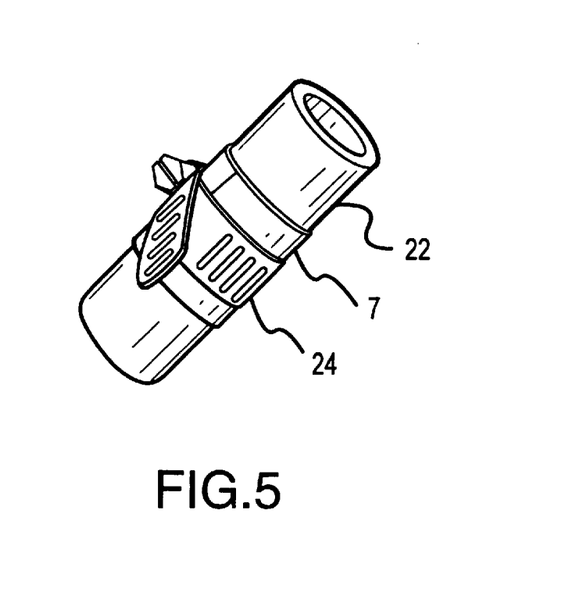
FIG. 5 is a depiction of the training of the shape memory alloy springs.

As was mentioned above the spring is made of shape memory alloy. Shape memory alloys include Cu—Zn—Al alloys, Cu—Al—Ni alloys and Ni—Ti alloys and the like. The shape memory material must be formed into a coil, and then "trained" into an identical coil. In order for the springs to have a spiral as a static state, strips of shape memory alloy must first be trained. Shown in FIG. 5 is a training fixture for establishing the static state in the spring. The first thing needed in order to train the springs is a cylinder 22 which has the same diameter as take-up spool 8. The shape metal alloy strip 7 is then wrapped around the cylinder 22 in an overlapping fashion, which forms the spring into a spiraling cylinder. The shape alloy memory spring 7 is then wrapped with bracket 24 to hold its shape. The whole assembly is then annealed at a predetermined temperature which creates an austenite state in the spring. The spring is then allowed to cool. The bracket is then removed and the spring is taken off the fixture. As a result of this process, the static shape for the spring is now established.

The training process described above creates a device which behaves in a different way than shape memory devices described in the prior art. Previously, actuators which use shape memory alloy take advantage of its length shape changing characteristics. In the present invention, instead of changing length, the shape memory alloy has been trained to change its modulus of elasticity when it is heated from its martensite state to its austenite state. The austenite threshold of the spring can be changed by varying the annealing temperature during training. When the spring is in its austenite state, the modulus of elasticity is up to seven times greater than the modulus of elasticity of the spring in its martensite state.

In the embodiment described herein the static state for the spring is a coiled spiral. If the spring is unwound, a certain amount of stress will be generated in the spring forcing it to return to its coiled state. The application of heat to the spring creates an austenite state that increases the modulus of elasticity. The increase in modulus increases the forces exerted in returning the spring to its static state. What is described above is one way of training a shape memory alloy spring. One skilled in the art would understand that if different performance parameters for the spring were desired, obvious modification to the above training technique and spring cross-section can be made to achieve those ends.

Referring again to FIG. 2, the shape memory alloy spring 7 has been trained to have a shape which wraps around take-up spool 8. In order to increase the force which is being applied on output device 9 by spring 7, heat is applied to the selected area of spring 7 which extends between take-up spool 8 and output device 9. This application of heat increases the modulus elasticity in the selected area which increases the force in which the spring is trying to return to its static state. This increase in force causes the spring to coil around output device 8 which increases the force applied by the spring to output device 9.

Figure 3:
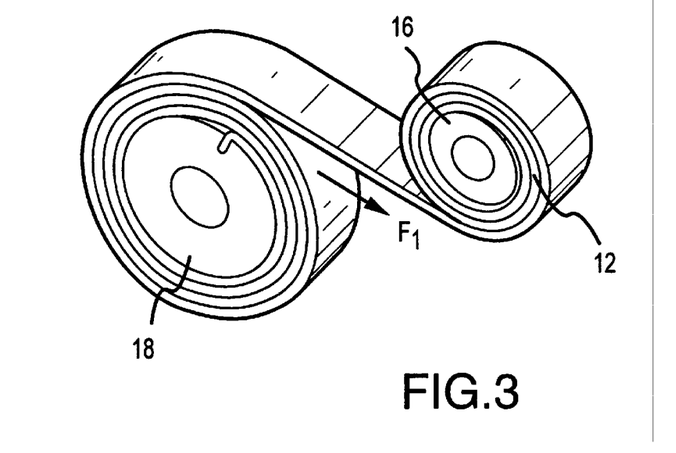
FIG. 3 is an embodiment of the invention where a rotational force is applied to an output cylinder in a single direction.

Disclosed in FIG. 3 is an embodiment of the invention where a rotational force is exerted on rotational device, such as output cylinder 18, in one direction. As described in the previous embodiment, the output spring 12 is made of shape memory alloy and is trained to have a static shape which wraps around take-up spool 16. The shape memory alloy spring 12 is connected to output drum 12 in such a manner that the spring is rotated in a direction opposite its static position. This manipulation of the spring applies a rotational force to output drum 18 in the clockwise direction. The output drum 18 may include some means for opposing the rotational force which is initially applied by shape memory alloy spring 12. If these two rotational forces are equal, the output cylinder will not rotate in either direction. If a rotation is desired in the clockwise direction, heat is applied to the selected area of spring 12 which extends between take-up spool 16 and output drum 18. The application of heat effects a austenite state in the spring which increases the modulus of elasticity in the selected area. This change in modulus increases the force exerted by the spring to return to its static state. This increase in force disrupts the equilibrium between the rotational forces and causes spring 12 to wind about spool 16. As a result, the output cylinder rotates in a clockwise direction. The number of rotations of the output cylinder is controlled by the number of times the spring is wrapped around the output cylinder and the amount of time that heat is applied to the output spring. Other variables which affect the amount of force applied to the output cylinder is distance between the take-up spool 16 and output 18, as well as the cross sectional area of the output spring 12 in the selected area.

Figure 4:
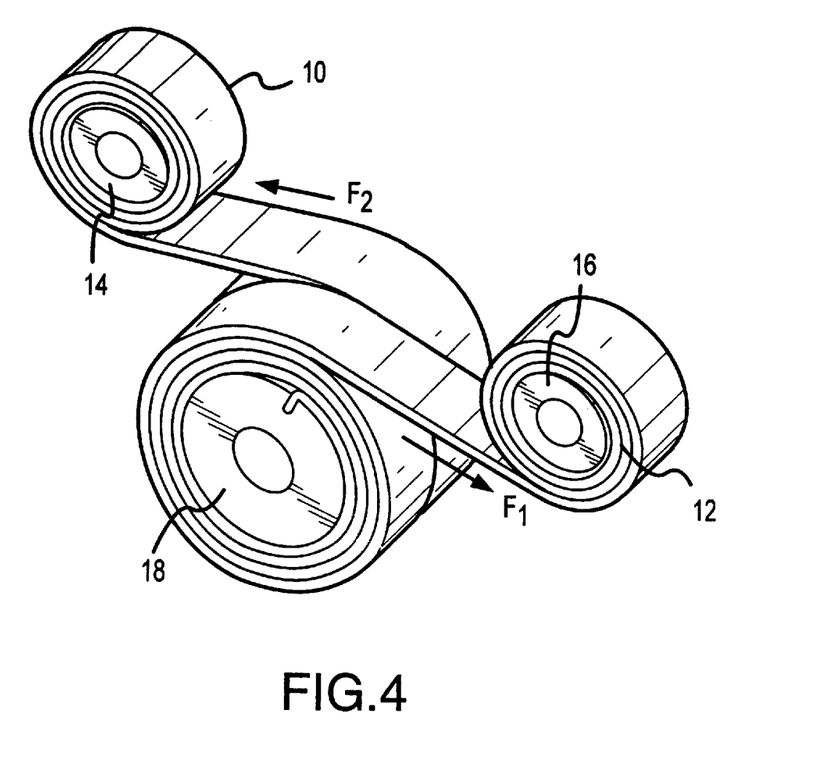
FIG. 4 is an embodiment of the invention where opposing rotational forces are exerted on the output cylinder by two shape memory alloy springs.

It may be desirable to apply rotational forces to an output cylinder in both the clockwise and counterclockwise direction. An apparatus for performing this function is shown in FIG. 4. In this embodiment, two equipment shape metal alloys springs 10 and 12 have been trained to have a shape which wraps around the take-up spools 14 and 16 respectively. When the shape memory alloy springs are attached to the output cylinder 18, the unwinding of the springs induces a stress in the alloy, and the act of rotating the spring in a direction opposite its static position, further increases the stress. If the springs have equal cross sectional areas and the spools are equally spaced from the output cylinder, equal and opposite rotational forces are exerted on the output cylinder 18.

In order to rotate the output cylinder in one direction or another, heat is applied to selected areas of either spring 10 or 12. If a clockwise rotation is desired, heat is applied locally to the selected area of spring 12 which extends between the coil portion of the spring on take-up spool 16 and output cylinder 18. The application of heat increases the modulus elasticity in the selected area which in turn increases forces returning the spring to its static state. This increase in force disrupts the equilibrium which had previously existed between the two springs and causes spring 12 to further wind around take up spool 16. The rotational forces exerted by spring 12 overcome any opposing forces causing spring 10 to unwind from around its take-up spool. The rotation of the output cylinder will occur as long as heat is continually applied to the selected area of the spring which extends between the output drum and the take-up spool. Because the spring is being unwound from output cylinder 18 and wound onto take-up spool 16, the selected area of the spring which is being heated is continually changing.

In order for the output cylinder to rotate in a counter-clockwise direction, the opposite process is performed. In that case, heat is applied to the selected area of spring 10 which extends between take-up spool 14 and output drum 18. This increases the modulus of elasticity of the shape memory alloy strip which induces a counterclockwise rotational force on output cylinder 18. With either spring, the maximum number of rotations the output drum will have is dependent on the number of times that the springs are wrapped around the drum.

In order to closely control the forces applied by the shape memory alloy springs described herein, heat is only applied to a selected area of the springs. There are many schemes described below for applying heat to the selected areas. All the descriptions below are described in terms of shape memory springs which are applying rotational forces to an output cylinder. One skilled in the art would know that any of the heat application schemes described below are equally applicable to any of the constant force spring actuator embodiments described herein.

Figure 6:
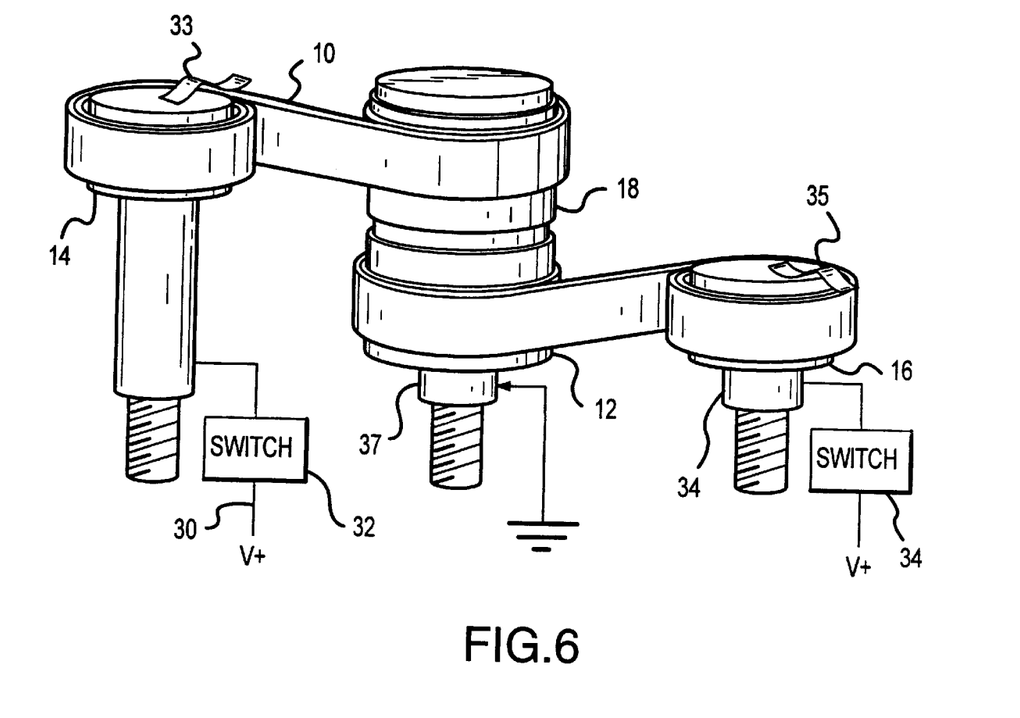
FIG. 6 is an embodiment of the invention where an electric potential is created between the take-up spools and the output cylinder.

Disclosed in FIG. 6 is one embodiment of the invention for applying heat to the selected area of the shape memory alloy springs. As was mentioned above, the shape memory alloy springs 10 and 12 are attached to take up spools 14 and 16 as well as output drum 18.

One characteristic of shape metal alloy is that it will conduct electrical current, however, the alloy does have a high internal resistance. The right current flowing through a cross section of shape memory alloy will generate a significant amount of heat. In the embodiment shown in FIG. 4, switchable electric potentials are created across take-up spools 14 and 16, to output cylinder 18. Switches 32 and 34 cause the flow of current through conductors 33 and 35, respectively, to the outer edges of the springs. The current flows through the selected areas of the springs to output cylinder 18, and then to ground 32. In this embodiment, the portion of the spring which is heated is localized, because as current flows through switches and ultimately to ground 32, it will take the path of least resistance. Using this current path, the heating of the entire spring is avoided which provides for better control of the rotation of the cylinder.

In operation, when switch 32 is closed, current is conducted through conductor 33 and into spring 10, which creates heat in the spring. The heat changes the modulus elasticity in the spring and induces a greater rotational force in the clockwise direction when looking down on the output cylinder. The opposite happens when switch 32 is open and switch 34 is closed. Current is conducted through the selected area of spring 12, which heats the spring and induces a greater rotational force in the counterclockwise direction.

Figure 7:
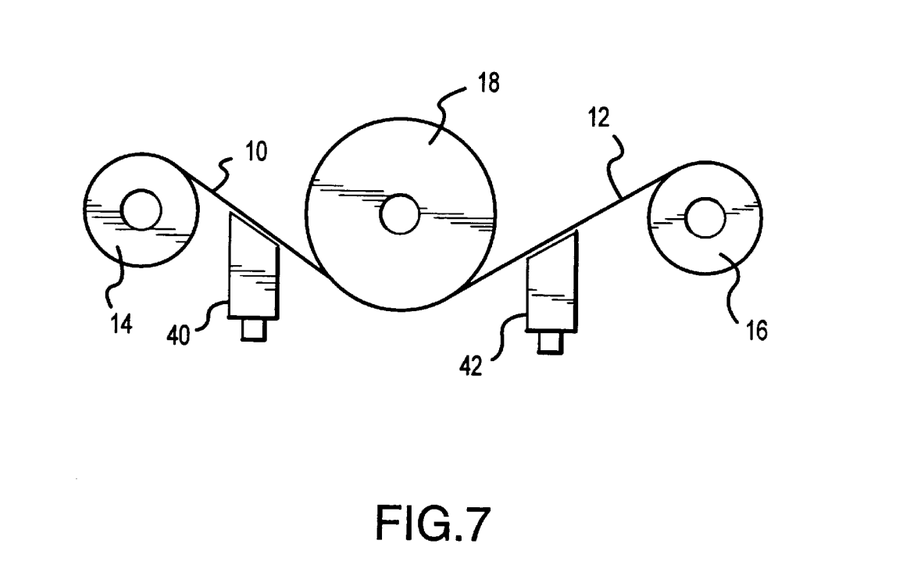
FIG. 7 is an embodiment of the invention where the heating elements are positioned between the output cylinder and the take-up spools proximate to the selected areas of the springs.

In another embodiment of the invention shown in FIG. 7, heating elements 40 and 42 are positioned touching or near the selected area of springs 10 and 12. These heating elements may be any sort of heating coil or device which can be switchably controlled and of sufficient size to heat the selected area of the spring to a austenite state.

In operation, if it is desired to have the output cylinder rotate in a clockwise direction, heating element 40 is turned on and heat is applied to the selected area of spring 10. The application of this heat changes the modulus elasticity of that particular segment of the spring, which in turn increases the forces that are returning the spring to its static state. These forces overcome the opposing forces of spring 12 and the output cylinder rotates in the clockwise direction. A counterclockwise rotation is induced by switching off the element 40, and applying heat with element 42.

Figure 8:
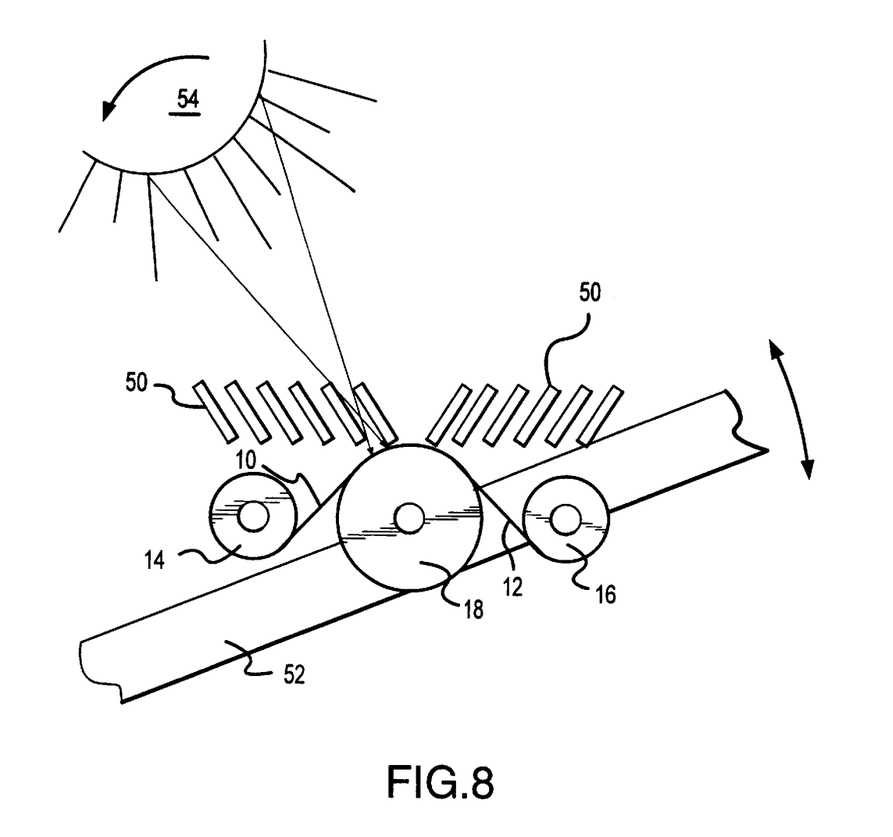
FIG. 8 is an embodiment of the invention in which a passive heat source is used to heat the springs.

The embodiments described above both include active heating sources for applying heat to selected areas of the shape memory alloy springs. The embodiment shown in FIG. 8 instead includes a passive heat source, such as the sun. When using a passive heat source, a mechanism may be provided to direct the source of heat onto the selected areas of the springs at particular times. The embodiment shown in FIG. 6 is a sun tracker device which can be used by a satellite or any other type of device which is rotating solar panels to follow the sun. The solar panels 52 are connected directly to the output cylinder 18. Positioned between the output cylinder and the sun are louvers 50. These louvers act to direct the heat of the sun onto the selected areas of the springs at particular times of the day. With the position of the sun as shown in FIG. 6, the louvers direct the light of the sun onto the selected area of spring 10. Because this selected area is heated by the sun, the output cylinder is rotated in a clockwise direction which rotates the solar panels 52 to follow the sun. The louvers 50 also act to block the sun so that it does not shine upon the selected area of spring 12. If the sun were in the right part of the sky instead of the left part of the sky, the opposite would occur.

One skilled in the art would realize that although the sun was used as an example of a passive heat source, it is conceivable that other types of passive heat sources could be used as well. Any passive heat source used may also need some sort of means to direct the heat onto the selected areas of the springs. In the example described above, the louvers were themselves passive, however, it is conceivable that some sort of active system can be used to open and close a shutter so that the heat is directed on the springs at the appropriate times.

Figure 9:
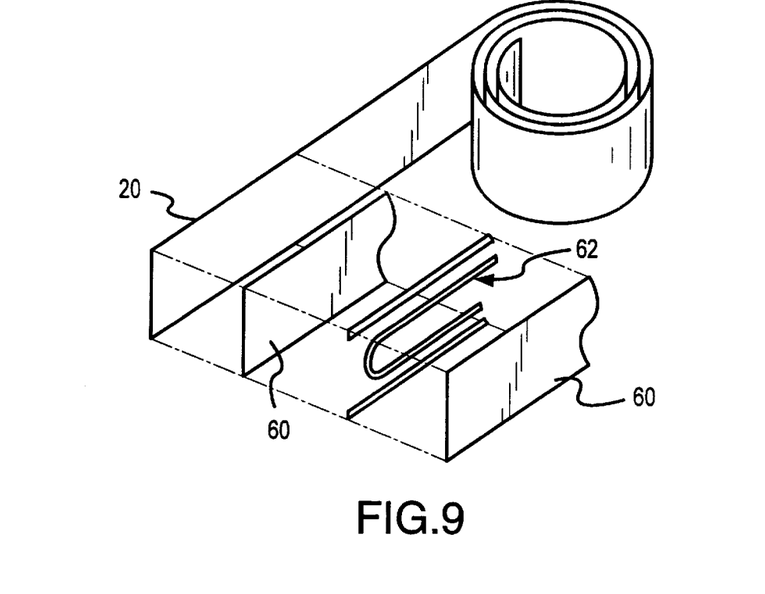
FIG. 9 is an embodiment in which heating tape is applied to the springs.

In a final embodiment of the invention, a different type of active heat source is employed. Although the heat source is still controllable by a switch, heat is applied to the entire length of the shape memory alloy spring instead of just the selected portion. In this embodiment, a heating tape is applied over the length of the spring. The composition of the tape is shown is shown in FIG. 9. A heating element 62 is captured between two layers of attachment tape 60. One side of the tape is adhesive and the whole heating assembly is attached to the spring. The tape is designed to match the shape of the spring in all its possible positions, in order to rotate the output cylinder. A current is run through the heating element 62 in order to provide heat to the shape memory alloy. The tape heats the entire length of the spring. The user of the device is able to switch between heating the two springs, depending on the desired direction of rotation.

The foregoing description of the present invention has been presented for purposes of illustration and description. Furthermore, the description is not intended to limit the invention to the form disclosed herein. Consequently, variations and modifications commensurate with the above teaching, and the skill or knowledge of the relevant art, are within the scope of the present invention. The embodiments described hereinabove are further intended to explain best modes known for practicing the invention and to enable others skilled in the art to utilize the invention in such or other embodiments and with various modifications required by the particular applications or uses of the present invention. It is intended that the claims be construed to include alternative embodiments to the extent permitted by the prior art.

What is claimed is:

1. An apparatus for applying rotational forces on a rotatable device comprising:

first shape memory alloy spring means connected to said rotatable device which exerts a first force on the rotatable device in a first rotational direction, the first shape memory alloy spring means has a first modulus of elasticity and upon application of heat to a selected area of the first spring means effects a austenite state in the selected area of the first spring means that creates a second modulus of elasticity and changes the first force; and second shape memory alloy spring means connected to said rotatable device which exerts a second force on the rotatable device in a second rotational direction which is opposite the first rotational direction, the second shape memory spring means has a first modulus of elasticity and upon the application of the heat to a selected area of the second shape memory alloy spring means effects the austenite state in the selected area that creates a second modulus of elasticity which changes the second force.

2. The apparatus of claim 1 further including heating means which selectively provides the heat for heating the selected areas of the first and second spring means depending on a desired direction of rotation.

3. The apparatus of claim 2 wherein heating means comprise means for conducting electrical current through the first and second spring.

4. The apparatus of claim 3 wherein the means for conducting electrical current across the selected areas of the first and second springs comprises heating tape applied to selected areas of the first and second springs.

5. The apparatus of claim 2 wherein the heating means is a passive source.

6. The apparatus of claim 1 wherein the first and second spring means are strips of shape memory alloy.

7. The apparatus of claim 6 wherein the first and second spring means are trained to have a static state of a tightly rolled spiral.

8. The apparatus of claim 7 wherein the first and second spring means are trained to retain the static state by coiling the strips in a spiral around a training fixture, wrapping the coil with a binding means to retain its shape, heating the strips to an annealing temperature, and allowing the strips to cool.

9. The apparatus of claim 8 wherein the annealing temperature establishes an amount of heat necessary to create an austenite state in the first and second spring means.

10. The apparatus of claim 7 wherein the first and second springs are each connected to a take up spool mounted at a fixed point relative to the rotatable device.

11. The apparatus of claim 10 wherein the selected areas are portions of the first and second spring means which extend between the rotatable device and said first and second spring means.

12. The apparatus of claim 7 wherein the first and second spring means are attached to the rotatable device in a rotational direction opposite the trained position.

13. The apparatus of claim 1 wherein the rotational device is an output cylinder.

14. The apparatus of claim 1 wherein the second modulus of elasticity for the first and second spring means is up to seven times greater than the first modulus of elasticity for the first and second spring means.

15. A constant force spring actuator for applying a force to an output device, comprising:

a first rotatable connection device; and a first shape memory alloy spring, with a first end connectable to the first rotatable connection device and a second end connectable to the output device in such a way that a first force is applied to the output device, wherein said first shape memory alloy spring has a first modulus of elasticity and upon application of heat to a selected area of the first shape memory alloy spring, a austenite change is effected in the selected area which creates a second modulus of elasticity in the selected area which increases the first force.

* * * * *

UNITED STATES PATENT AND TRADEMARK OFFICE
CERTIFICATE OF CORRECTION

PATENT NO. : 6,129,181
DATED : October 10, 2000
INVENTOR(S) : Weems

It is certified that error appears in the above-identified patent and that said Letters Patent is hereby corrected as shown below:

<u>Title page,</u>
Item [73], please insert Assignee, -- Lockheed Martin Corporation, Bethesda, Maryland --

Signed and Sealed this

Sixteenth Day of July, 2002

Attest:

Attesting Officer

JAMES E. ROGAN
*Director of the United States Patent and Trademark Office*